Sept. 25, 1956 D. GLASSER 2,764,081
TOASTER
Filed March 15, 1954 3 Sheets-Sheet 1

INVENTOR.
DAVID GLASSER,
BY
Flam and Flam
ATTORNEYS

Sept. 25, 1956
D. GLASSER
2,764,081
TOASTER
Filed March 15, 1954
3 Sheets-Sheet 2
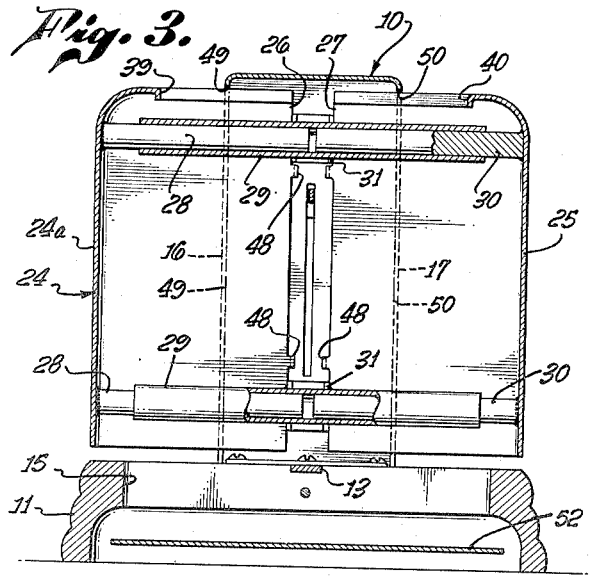
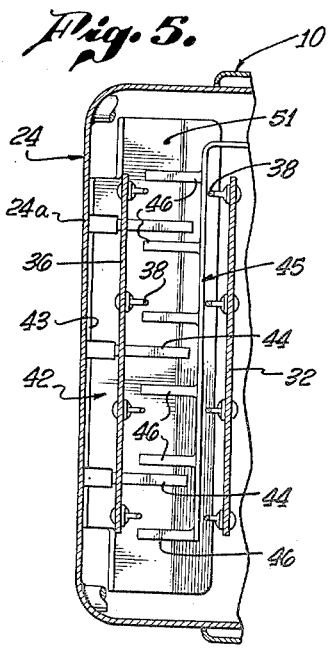
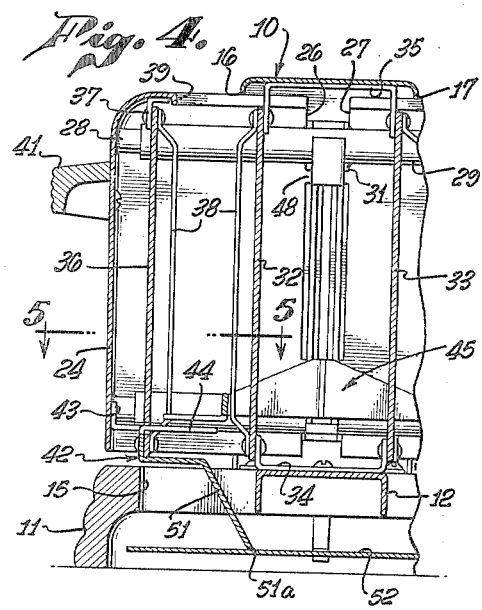
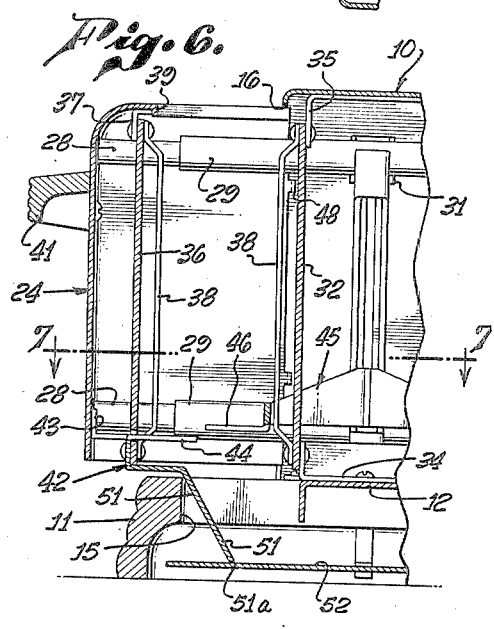
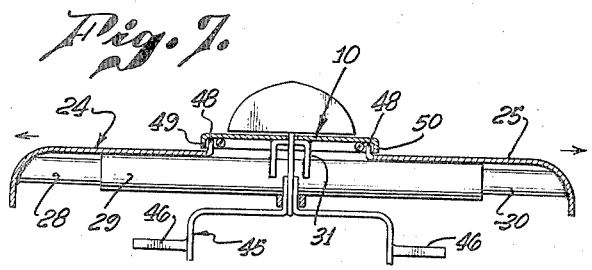
INVENTOR.
DAVID GLASSER,
BY
Flam and Flam
ATTORNEYS.

Sept. 25, 1956 D. GLASSER 2,764,081
TOASTER
Filed March 15, 1954 3 Sheets-Sheet 3
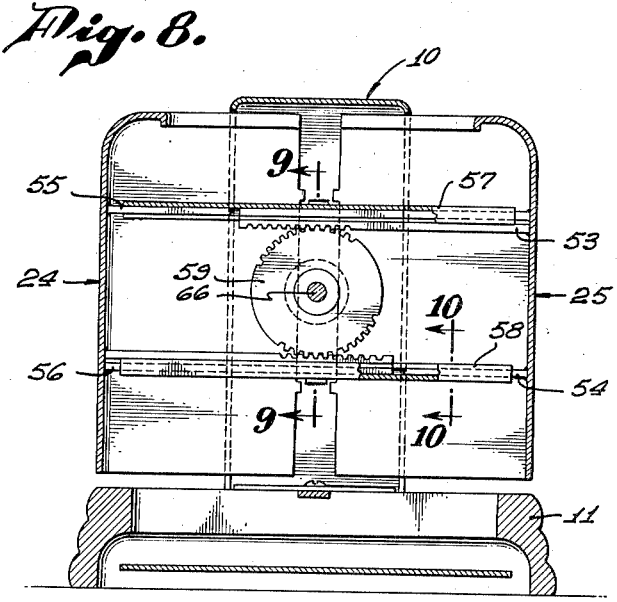
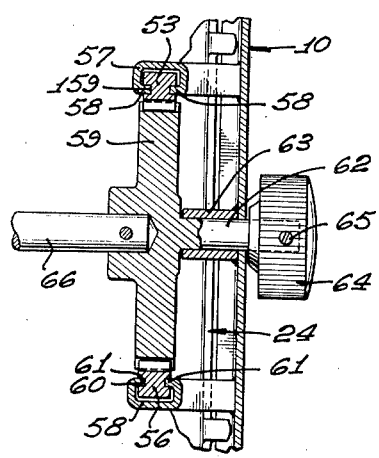
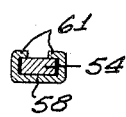
INVENTOR.
DAVID GLASSER,
BY
Flam and Flam
ATTORNEYS.

United States Patent Office 2,764,081
Patented Sept. 25, 1956

2,764,081

TOASTER

David Glasser, Beverly Hills, Calif.

Application March 15, 1954, Serial No. 416,241

4 Claims. (Cl. 99—391)

This invention relates to a bread toaster, and particularly to a toaster of this character adapted to accommodate slices of bread of different thicknesses, or to accommodate rolls or similar bread products.

In the usual form of toaster, there is a slot for accommodating a slice of bread to be toasted. Such toasters cannot accommodate a very thick slice, a bun, or roll.

It is an object of this invention to provide a simple toaster that overcomes these disadvantages by a novel and simple arrangement. For this purpose, the space for accommodating the bread is capable of being widened while maintaining the walls of the space generally parallel. One of two opposed heating elements is adjustable along with the wall. In this manner, the distance of the heating elements from the surface of the item being toasted is independent of the thickness of the item. Optimum toasting conditions are thus not altered, and control of toasting conditions is simplified.

It is another object of this invention to provide an apparatus of this character that is simple in construction and easily operated.

This invention possesses many other advantages, and has other objects which may be made more clearly apparent from a consideration of several embodiments of the invention. For this purpose there are shown a few forms in the drawings accompanying and forming part of the present specification. These forms will not be described in detail, illustrating the general principles of the invention; but it is to be understood that this detailed description is not to be taken in a limiting sense, since the scope of the invention is best defined by the appended claims.

Referring to the drawings:

Fig. 3 is a transverse sectional view of the toaster, taken along the plane indicated by line 4—4 of Fig. 2;

Fig. 4 is a fragmentary sectional view, taken along the plane indicated by line 4—4 of Fig. 2;

Fig. 5 is a fragmentary horizontal sectional view taken along a plane indicated by line 5—5 of Fig. 4, showing particularly the mechanism for supporting the item to be toasted;

Fig. 6 is a fragmentary sectional view, similar to Fig. 4 but showing the toaster in a different adjusted position;

Fig. 7 is a fragmentary horizontal sectional view, taken along the plane indicated by line 7—7 of Fig. 6;

Fig. 8 is a sectional view, similar to Fig. 3, but showing a modified form of the present invention; and Figs. 9 and 10 are enlarged sectional views taken along planes indicated by lines 9—9 and 10—10, respectively, of Fig. 8.

Figure 1:
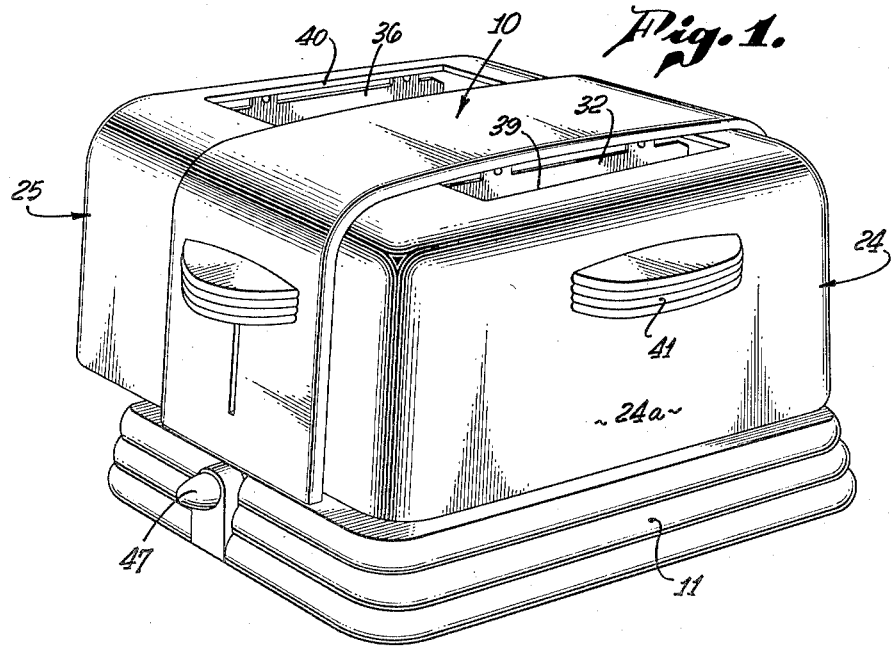
Figure 1 is a pictorial view of an automatic toaster embodying the present invention.
Figure 2:
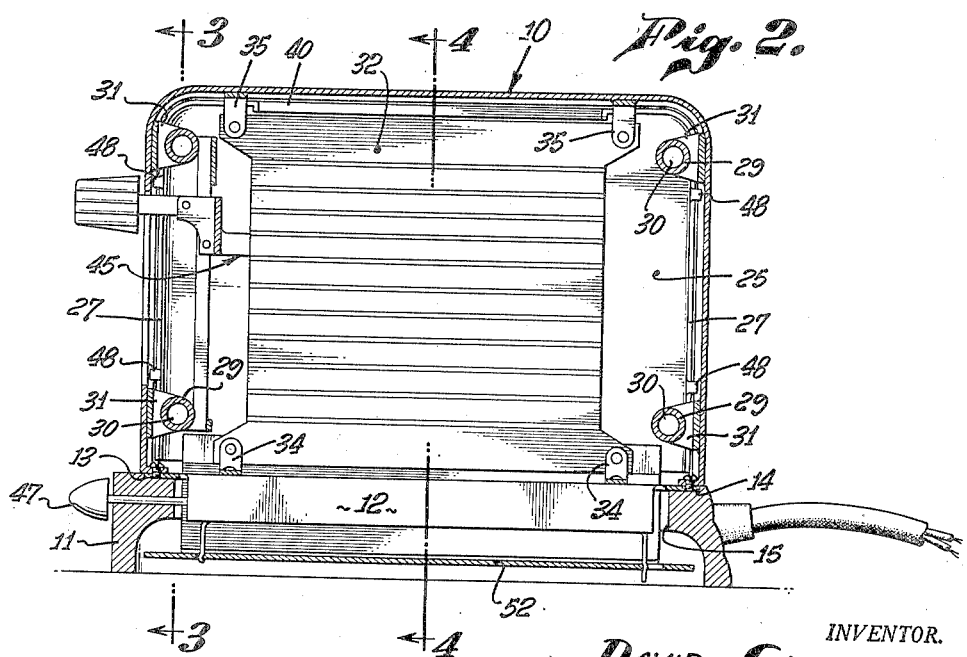
Fig. 2 is a longitudinal central sectional view of the toaster shown in Fig. 1.

An inverted U-shaped housing member 10 (Figs. 1 and 2), secured upon a hollow base 11, houses most of the operative parts of the toaster mechanism. A plate 12 corresponding substantially to the width of the housing 10 extends across the base. Ears 13 and 14 integrally formed at opposite ends of the plate 12 rest upon opposite walls of the base (Fig. 2). The housing 10 extends from the plate 12 and has feet overlying the ears 13 and 14 and secured to the base 11. This serves as well to attach the channel plate 12 upon base 11.

The housing 10 defines openings 16 and 17 on opposite sides.

A pair of shells 24 and 25 cooperates with the housing member 10 to form symmetrically disposed heated spaces in which items to be toasted may be received. The shells 24 and 25 are generally of rectangular configuration, open at the bottom. Each shell has edges 26 and 27 forming a side opening that is contiguous with the bottom opening. The lateral openings 16 and 17 of the housing 10 are of a size sufficient telescopingly to receive the shells 24 and 25 with the side openings of the shells in registry with the housing opening. The telescoping parts form enclosures on opposite sides of the housing 10.

The shells 24 and 25 are supported in such manner that they may be moved toward or away from the housing 10 so that the sizes of the heated spaces defined by the shells 24 and 25 and the housing 10 are correspondingly diminished or increased.

One manner of supporting the shells is shown in Figs. 1 to 7. The shell 24, for instance, has four parallel, horizontally extending posts 28 within the shell 24, having corresponding ends secured in place upon the outer wall 24a of the shell. The free ends of the posts 28 extend slightly beyond the side opening formed by the edges 26 (see Fig. 3). The four posts 28 are respectively located near the corners of the side opening and the opposite end wall 24a of the shell 24, and have clearance with respect to the top and end walls of the shell 24.

Four parallel, horizontally extending tubular supporting members or sleeves 29 carried by the housing 10 project symmetrically beyond the lateral openings 16 and 17 thereof. Corresponding ends of the tubular members 29 guidingly receive the posts 28. Posts 30, similarly formed upon the other shell 25, are guidingly accommodated in the corresponding opposite ends of the tubular members 29.

Clevises or standards 31 (see Fig. 2) mount the tubular members 29 upon the housing 10.

Within the bounds defined by the supporting members 29 and located slightly inwardly of the lateral openings 16 and 17 of the housing 10 are generally flat rectangular electric heating elements 32 and 33, which may be of conventional form. Each of the elements 32 and 33 forms one-half of the heating unit for each of the heated spaces defined by the respective shells 24 and 25. Brackets 34 and 35, secured respectively to the bottom plate 12 and the top wall of the housing 10, support the heating elements 32 and 33.

Within the bounds defined by the posts 28, similar heating elements 36 are respectively provided in the shells 24 and 25 near the outer walls thereof. The heating elements 36 of the respective shells 24 and 25 respectively oppose the heating elements 32 and 33 carried by the housing 10. Brackets 37, depending from the top walls of the shells 24 and 25, are provided for the heating elements 36. Suitable flexible conductors (not shown) are provided for the heating elements mounted on the movable shells.

Guide cages 38, each comprising a series of spaced-apart, vertically extending rods, or wires, are spaced slightly inwardly of the opposed heating elements of each unit. The guides 38 cooperating with the stationary heating elements 32 and 33 extend substantially in the plane of the lateral openings 16 and 17 of the housing 10.

The top walls of the cover plates 24 and 25 have rectangular openings 39 and 40 (Fig. 1), extending inwardly from the edges 26 and 27 forming the side openings, the recesses respectively extending inwardly to the plane of those guides 38 cooperating with the movable heating elements 36 (see also Fig. 4). The openings 39 and 40 in the top walls of the shells 24 and 25 provide access to the respective heating spaces for an item to be toasted, the item being accommodated between the two guides 38 of each heating unit. Of course, these openings 39 and 40 can be made as large as desired to facilitate access to the toaster spaces.

The shells 24 can be moved with respect to the housing 10 so as to vary the spacing between the guides 38. Handles 41, secured in place upon the outer walls of the shells 24 and 25, are provided for this purpose. The shells 24 and 25 are pulled outwardly to accommodate an item of large thickness, such as a half or whole roll or bun, and are moved inwardly to accommodate an item of small thickness, such as a thin slice of bread. Since the heating elements 32 and 36 are also correspondingly moved with respect to each other, the spacing of these heating elements from the corresponding opposite surfaces of the item to be toasted is independent of thickness of the item to be toasted. Accordingly, proper and even toasting of the item can be accomplished, and control of the extent of toasting is simple despite the feature of adjustability.

Supports 42, having feet 43 secured in place upon the outer walls of the shells 24, have spaced fingers 44 (see, also, Fig. 5) projecting through clearance spaces through the bottom of the heating element 36 and into the space between the guides 38. When the toaster is operative, fingers 44 form a portion of a rest for the item to be toasted.

Conveniently, lower portions of the heating elements 36 can be secured to the supports 42.

An automatic mechanism, including supports 45 movable vertically in the spaces between the opposed guides 38, is provided. The vertically movable supports 45 extend from the space between the stationary heating elements 32 and 33 about the respective elements and into the space between the guides 38. A series of fingers 46 provided on the movable supports 45, project inwardly between the opposed guides 38. These fingers 46 serve as a rest for the item when the movable support is raised, and cooperate with the fingers 44 of the support 42 to form a rest for the item when the movable support 45 is lowered.

When the shells 24 and 25 are moved inwardly, the fingers 44 and 46 of the movable and stationary supports 42 and 45 are interspaced between each other. When the shells 24 and 25 are moved outwardly, the fingers 44 and 46 separate.

In a well known manner when the toaster is inoperative, the movable supports 45 are in their uppermost position. When the toaster is operative, the supports 45 are moved downwardly correspondingly to position the item of food. After a period of operation, such as controlled by an adjustment knob 47, the movable support 45 moves upwardly to lift the item of food from the heating space.

Outward movement of the shells 24 and 25 is limited by outwardly turned ears 48 (see particularly Fig. 2) located about the edges 26 and 27 of the openings. Inwardly extending flanges 49 and 50, defining the lateral opening of the housing 10, are in the paths of movement of the ears 48 and accordingly limit outward movement of the shells 24 and 25.

For providing a compact arrangement, the toaster base 11 has a configuration conforming to the size of the toaster when the shells 24 and 25 are in their inwardmost positions. The lower openings of the shells 24 and 25 accordingly may extend above and slightly beyond the base 11 when the shells 24 and 25 are in their outwardmost positions.

To ensure against crumbs dropping exteriorly of or upon the base 11, the food supports 42 on the movable shells 24 and 25 have depending walls 51 projecting into the base aperture 11 and substantially from side to side. The walls 51 slope inwardly. A crumb catching plate 52, detachably supported beneath the base aperture 15, collects all of the falling crumbs. The lower edge 51a of the sloping wall 51 of the support 42 closely overlies the crumb catching plate 52 for adjusted positions of the shells 24 and 25.

In the forms shown in Figs. 9 and 10, a slightly different arrangement is provided for supporting the shells 24 and 25 for movement relative to the housing 10.

Each of the shells 24 and 25 has four supporting elements projecting inwardly from the outer walls thereof. In Fig. 8, two of four support elements 53 and 54 for the shell 25 are shown, and two of the four elements 55 and 56 for the shell 24 are shown.

The supporting elements 53, 54 of the shell 25 are parallel to each other and extend horizontally within the shell 25 from the outer wall thereof.

Four parallel horizontally extending guide elements, generally similar to the tubular members 29 of the previous form, are carried by the housing 10 and project symmetrically beyond the lateral openings of the housing 10. Two such guide elements 57 and 58 are shown in Fig. 8. The right-hand ends of the upper and lower guide elements 57 and 58 accommodate the supporting elements 53 and 54 respectively. The supporting elements 55 and 56 are similarly received in the left-hand open ends of the guide elements 57 and 58.

In the present instance, the upper supporting element 53 for the shell 25 is in the form of a rack that is engageable with a pinion 59 mounted within one side wall of the housing 10. The guide element 57 is generally hollow, having an open lower side bounded by opposed inwardly extending flanges 58. These lateral flanges 58 engage respectively longitudinally extending grooves 159 formed on opposite sides of the rack 53. The guide element 57 thus forms a track for the rack 53. The operative portion of the rack 53 projects beneath the guide element 57 for engagement with the upper element of the pinion 59.

The lower supporting element 54 as shown in Fig. 10 is in the form of a simple post entirely accommodated within the hollow guide element 58. The guide element 58 is of the same configuration as the upper guide element 57, having an upper open side bounded by opposed inwardly extending flanges 61.

The lower supporting element 56 for the left-hand shell 24 is in the form of a rack also engageable with the pinion 59. The supporting element 56 for the shell 24 has longitudinally extending grooves 60 in which are accommodated respectively in opposed spaced lateral flanges 61 of the guide element 58. The operative portion of the rack 56 extends upwardly of the guide element 58 for cooperation with the lower element of the pinion 59.

The upper supporting element 55 for the shell 24 is accommodated within the left-hand end of the upper guide element 57.

The pinion 59 has a stub shaft 62 projecting outwardly of the housing 10 through an aperture in the wall thereof. A bearing sleeve 63, secured within the casing 10, supports the stub shaft 62.

A knob 64, rotatably connected to the stub shaft 62 as by a set screw 65, serves as a means for imparting rotation to the pinion 59. Upon movement of the knob 64 in a direction to turn the pinion 59 in a clockwise direction as viewed in Fig. 8, the racks 53 and 56 are moved outwardly of the housing 10 correspondingly moving the shells 25 and 24. By a simple operation of the knob 64, the shells 24 and 25 are simultaneously and correspondingly positioned.

A corresponding arrangement is provided at the opposite side wall of the casing 10. A shaft 66 may interconnect the pairs of pinions at opposite side walls of the housing 10 for operation by the knob 64.

The knob 64 serves as a single means for operating the entire mechanism.

The inventor claims:

1. In a toaster: a base; an oven forming housing structure, comprising: a central housing member carried by the base having aligned openings on opposite sides, the axis of alignment being substantially parallel to the base, and a pair of hollow shells maintained in telescoping relationship with the housing member at the openings respectively and movable parallel to said axis of alignment while said shells are in telescoping relationship with the housing member; a first pair of heating elements carried by the housing member at the openings respectively; a second pair of heating elements carried respectively by the shells and respectively in opposing relationship to the first pair of heating elements; said shells forming with the housing member adjustable spaces for the reception of items to be heated, there being openings in the housing structure opposite the base, the size of which depends upon the relative telescoping position of the shells and the housing member to permit insertion of said items between the heating elements of the housing member and the shells respectively; and movable food supports carried by the housing member upon which the items to be toasted may rest, and aligned with said adjustable openings in the housing structure, said supports being movable to position the items between the heating elements and to position the items upwardly to extend at least partially outwardly of the adjustable openings.

2. In a toaster: a base; a housing member extending across the base and upwardly therefrom, said housing member having aligned openings on opposite sides; a pair of hollow shells each having edges forming an opening registering respectively with the housing openings and telescopingly received in said housing openings; said shells extending above the base on opposite sides of the housing member; means carried by the housing member for supporting and confining the shells for telescoping movement in a direction substantially parallel to the base to vary the extent of telescoping relationship between the shells and the housing member; means determining a limited outward telescoping position of the shells with respect to the housing member; a first pair of heating elements carried respectively by the shells; a second pair of heating elements carried by the housing member, and located at the housing openings in opposing relationship respectively to the first pair of heating elements; said shell edges being recessed at those portions of the shells opposite the base to form with the edges of the housing member, openings of sizes dependent upon the relative telescoping position of the shells and the housing member for insertion of items to be toasted between the elements of the housing member and the elements of the shells, respectively; and movable food supports carried by the housing member upon which the items to be toasted may rest, and aligned with the adjustable openings, said supports being movable to position the items between the heating elements and to position the items upwardly to extend at least partially outwardly of the adjustable openings.

3. In a toaster: a generally rectangular ported base adapted to rest upon a support; a generally inverted U-shaped housing member having opposite ends secured at opposite portions of the base, and extending upwardly therefrom, said housing member having openings on opposite sides aligned on an axis, substantially parallel to the base; a first pair of heating elements carried by the housing member and located at the housing member openings; a plurality of elongate tubular members rigidly carried by the housing member and extending about the periphery of the heating elements and at opposite ends through the respective housing openings in a direction parallel to said axis; a pair of hollow shells each having edges forming an opening registering respectively with the housing member openings and received therein; a plurality of posts for each shell and having ends secured to the inner wall of the corresponding shell remote from the shell opening, the posts for the shells being guidingly received in the corresponding ends of the tubular members for adjustably mounting the respective shells for relative telescoping movement into the respective housing openings; the tubular members and posts confining the shells for telescoping movement with respect to the housing member; a second pair of heating elements carried respectively by the shells between the posts and opposed to the heating elements of the housing member; said shell edges having recesses at those portions of the shells opposite the base to form openings of sizes dependent upon the relative telescoping position of the shells and the housing member for insertion of items to be toasted between the elements of the housing member and the elements of the shells, respectively; a first pair of wire guide structures respectively carried by the shells and overlying the heating elements of the shells; a second pair of wire guide structures carried by the housing member and overlying respectively the heating elements of the housing member; the shells each being open opposite the base; the shells having outwardly turned ears engageable about the edges of the housing openings to determine an outward limited telescoping position of the shells; and movable food supports carried by the housing member upon which the items to be toasted may rest, and aligned with the adjustable openings, said supports being movable to position the items between the heating elements and to position the items upwardly to extend at least partially outwardly of the adjustable openings.

4. In a toaster: a base having an aperture; a casing member supported on the base and having edges forming openings on opposite sides; heating elements carried by the casing at said openings; a pair of hollow shells in telescoping relationship with the casing edges at the openings respectively, the shells extending above the base on opposite sides of the casing member, the bottom of the shells being open; heating elements carried by the shells and opposing, respectively, the heating elements of said casing; means for supporting said shells for permitting adjustment of the extent of telescoping movement of the shells and the casing for adjustment of the space between the opposed heating elements and confining the shells to telescoping movement with respect to the casing member; the shells having outward limits of movement in which said shells extend beyond the base; and guide plates carried by the shells and extending inwardly beneath the spaces between the opposing heating elements, the lower edges of the plates being located within the base aperture for all adjusted positions of the shells.

References Cited in the file of this patent

UNITED STATES PATENTS

| | | |
|---|---|---|
| 251,531 | Dickinson | Dec. 27, 1881 |
| 665,091 | Griffith | Jan. 1, 1901 |
| 1,288,881 | Harter | Dec. 24, 1918 |
| 1,656,181 | Elbert | Jan. 17, 1928 |
| 1,687,712 | Chandler | Oct. 16, 1928 |
| 1,713,303 | Serrell | May 14, 1929 |
| 1,729,937 | Ginder | Oct. 1, 1929 |
| 1,762,325 | Blair et al. | June 10, 1930 |
| 1,814,942 | Mabey | July 14, 1931 |
| 1,839,112 | Mills | Dec. 29, 1931 |
| 1,955,867 | Wilkie et al. | Apr. 24, 1934 |
| 2,042,215 | Edison | May 26, 1936 |